United States Patent [19]

Hoeffken

[11] Patent Number: 4,649,894

[45] Date of Patent: Mar. 17, 1987

[54] HEAT EXCHANGER AND PLATE ASSEMBLY AND METHOD OF MANUFACTURE

[75] Inventor: Russell W. Hoeffken, Belleville, Ill.

[73] Assignee: SnyderGeneral Corporation, Minneapolis, Minn.

[21] Appl. No.: 490,552

[22] Filed: May 2, 1983

Related U.S. Application Data

[60] Continuation-in-part of Ser. No. 329,778, Dec. 11, 1981, Pat. No. 4,547,943, which is a division of Ser. No. 178,337, Aug. 15, 1980, abandoned.

[51] Int. Cl.$^4$ .............................................. F24H 9/14
[52] U.S. Cl. .................................... 126/119; 29/157.5; 29/157.3 R; 165/178
[58] Field of Search ............ 126/119, 99 R; 165/178; 29/157.5, 157.3 R

[56] References Cited

U.S. PATENT DOCUMENTS

| | | | |
|---|---|---|---|
| 167,339 | 8/1875 | Jerrold . | |
| 683,670 | 10/1901 | Tinkham | 126/119 |
| 737,494 | 8/1903 | Sanborn et al. | 126/119 |
| 1,005,760 | 10/1911 | Workman . | |
| 1,406,875 | 2/1922 | Kreutzberg et al. | 126/119 |
| 2,164,629 | 7/1939 | Sibley | 113/118 |
| 2,401,502 | 6/1946 | Olds | 126/119 X |
| 2,464,506 | 3/1949 | Hirschfield | 285/49 |
| 2,923,349 | 2/1960 | Marble et al. | 126/119 |
| 3,696,862 | 10/1972 | Dijk | 165/178 |
| 3,908,629 | 9/1975 | Wiese | 126/119 |
| 3,940,837 | 3/1976 | Wiese | 126/119 X |
| 4,068,372 | 1/1978 | Kamohara et al. | 29/727 |
| 4,233,726 | 1/1980 | Williams | 29/507 |
| 4,245,960 | 1/1981 | Matthews | 416/244 |
| 4,369,569 | 1/1983 | Armstrong, Jr. et al. | 29/726 |
| 4,400,965 | 8/1983 | Schey | 72/334 |

FOREIGN PATENT DOCUMENTS 1285511  8/1972  United Kingdom ........... 29/157.3 C

*Primary Examiner*—Larry Jones
*Attorney, Agent, or Firm*—Richards, Harris, Medlock & Andrews

[57] ABSTRACT

A furnace heat exchanger and support plate assembly are joined together at respective openings for the burner assembly and for the combustion products outlet by an oval rim defining the heat exchanger opening and a cooperating flange on a partition plate and extending perpendicular to the plane of the plate. The flange on the partition plate is inserted in the opening in the heat exchanger unit and expanded radially outward with respect to the central longitudinal axis of the openings to form a leakproof joint. An improved method of forming the joint includes the use of an expander mechanism which may be inserted through the opening in the plate into the interior of the heat exchanger and engaged with the plate flange to expand the flange radially outwardly. A complete nonwelded furnace heat exchanger assembly includes one or more support members which are secured to flanges of the heat exchanger units without welding or mechanical fasteners.

15 Claims, 23 Drawing Figures

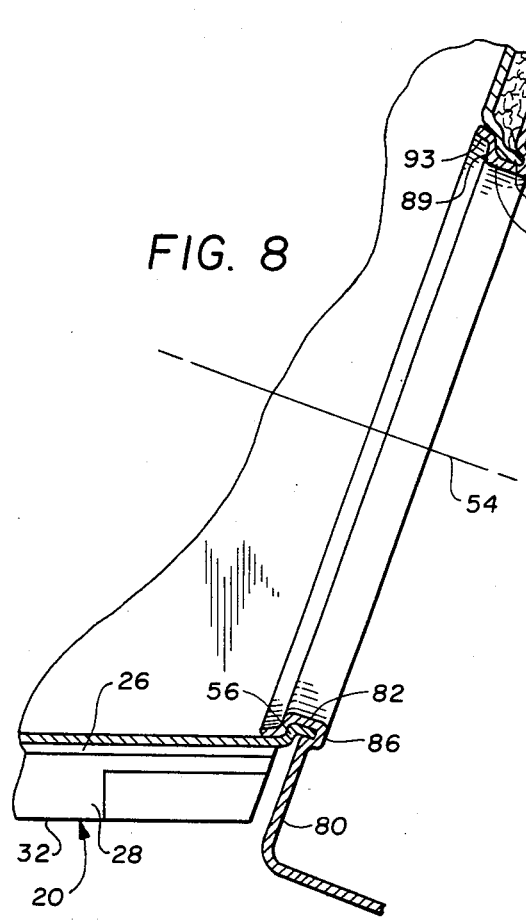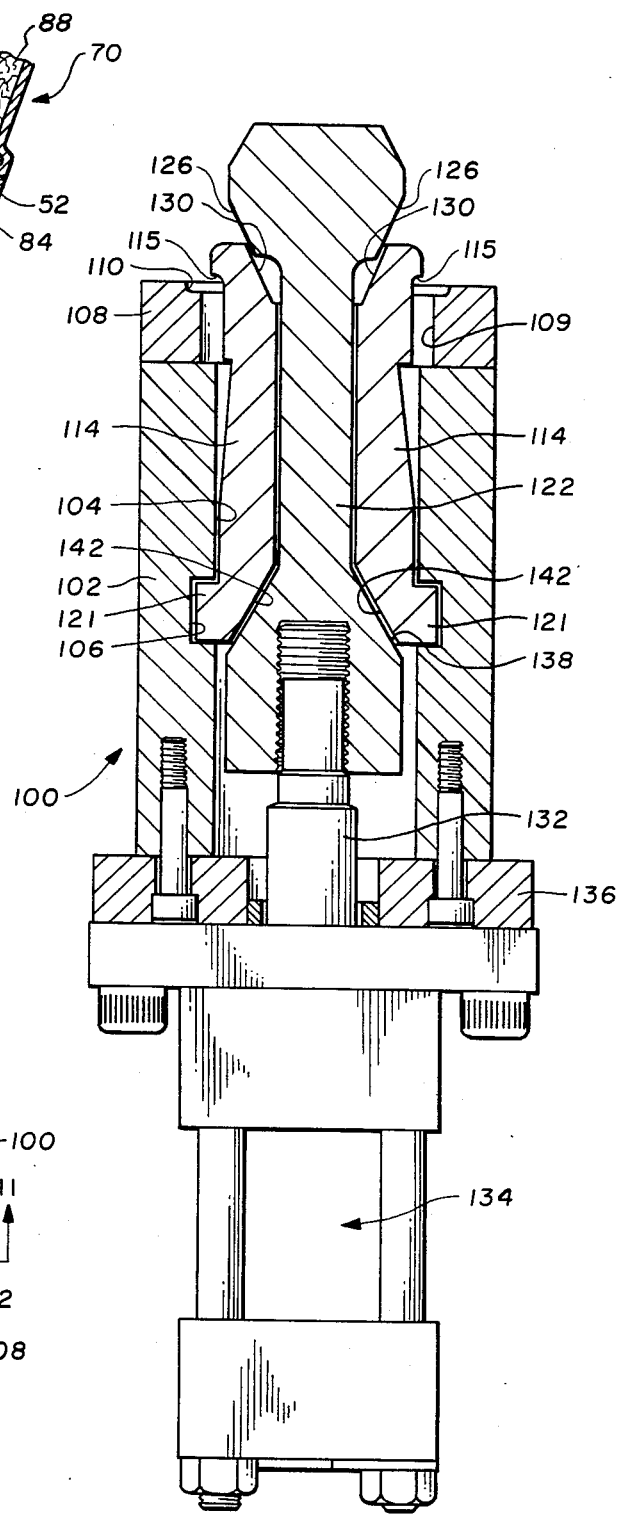
FIG. 8
FIG. 10
FIG. 9

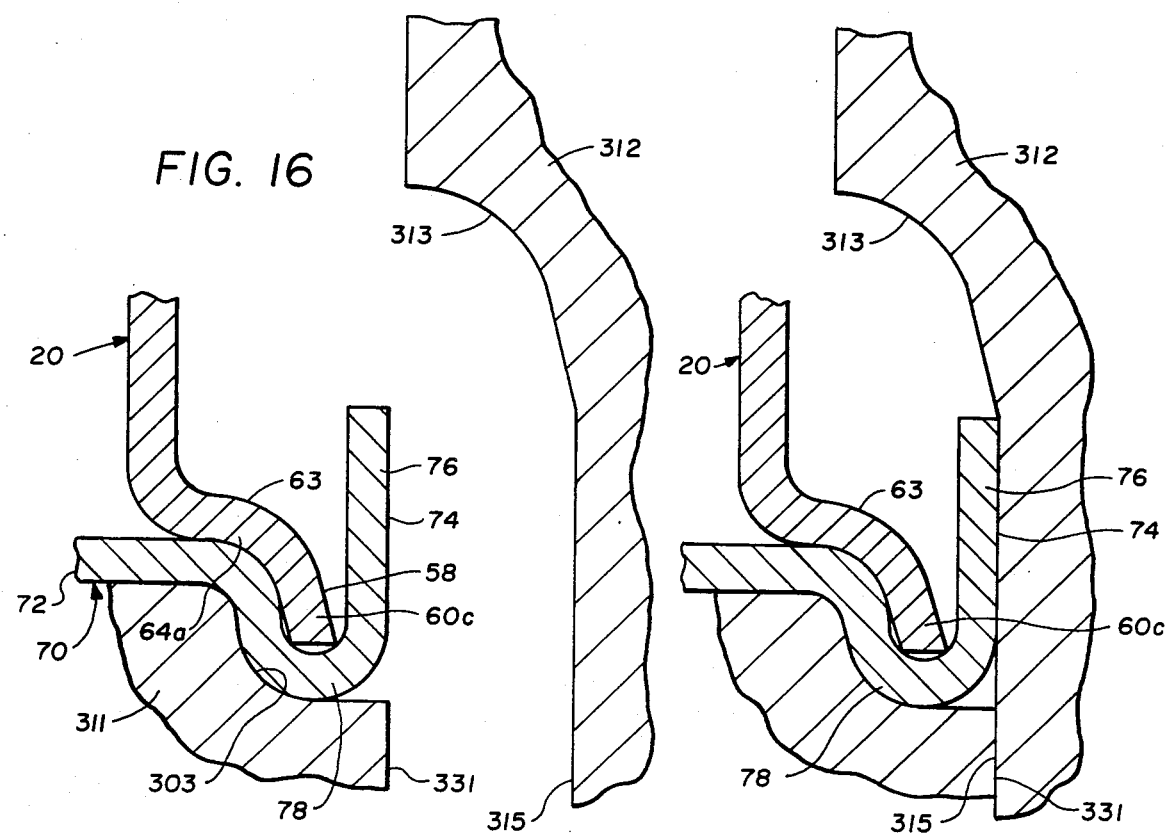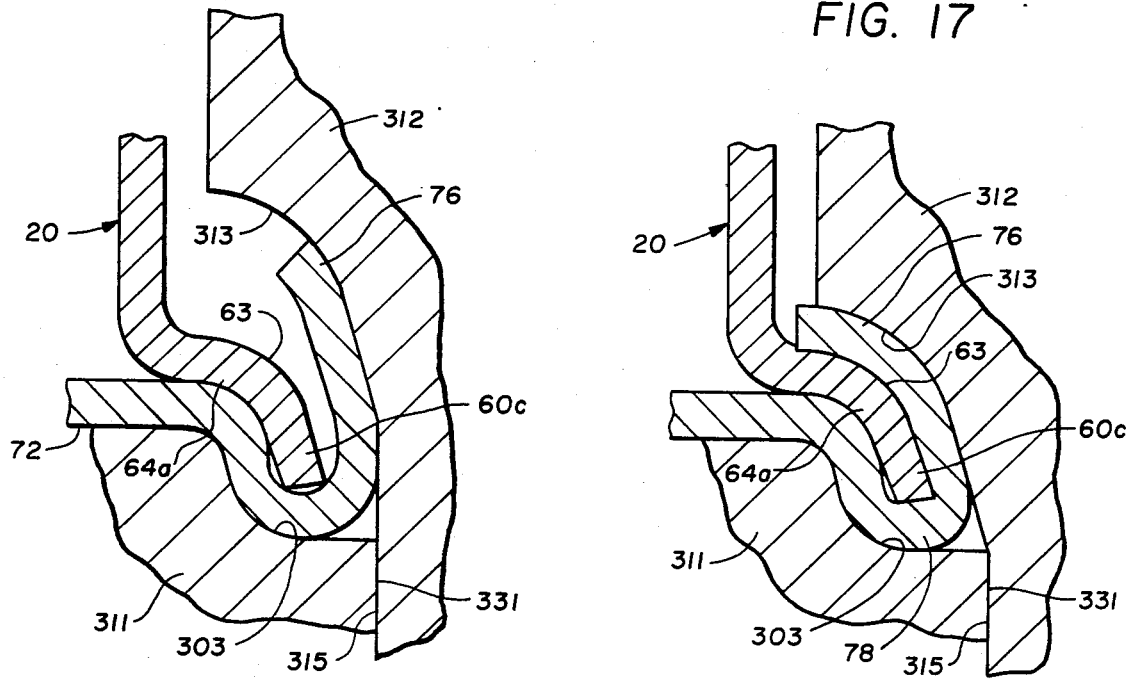

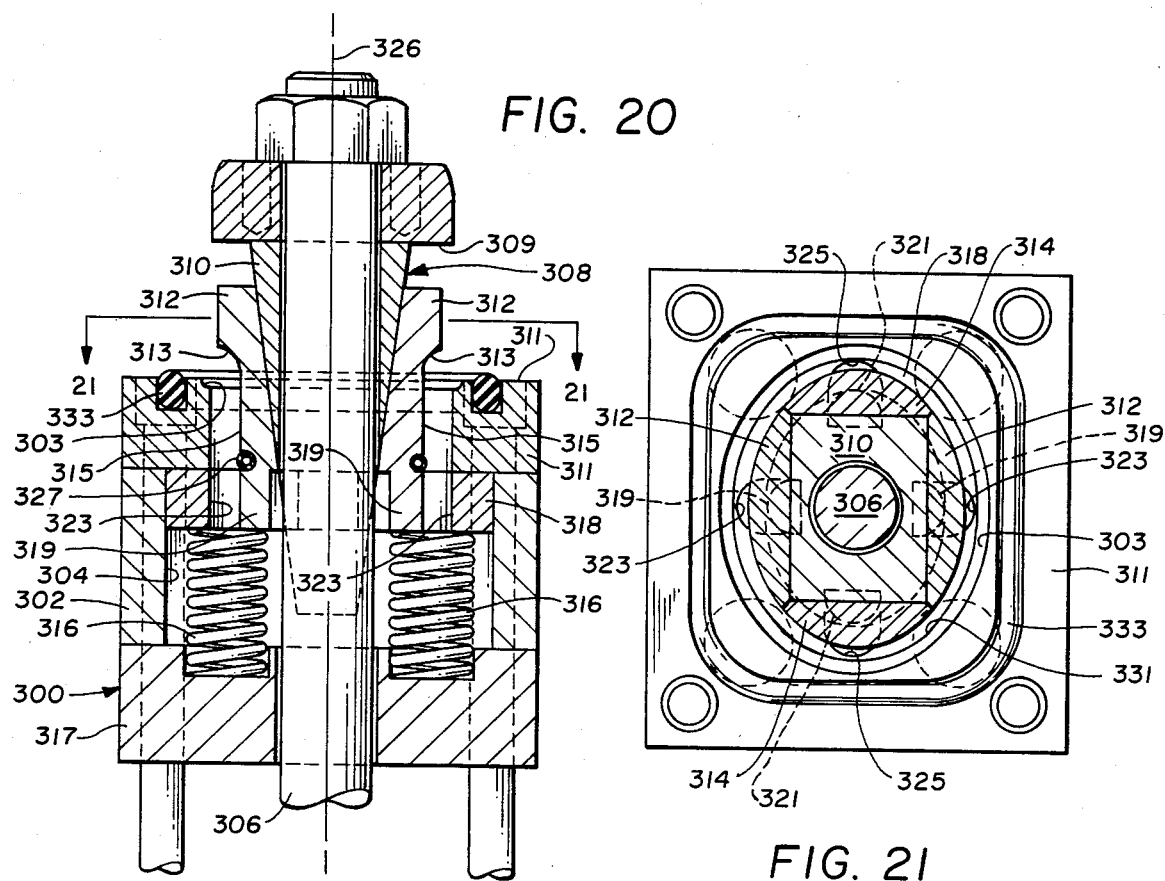
*FIG. 20*
*FIG. 21*
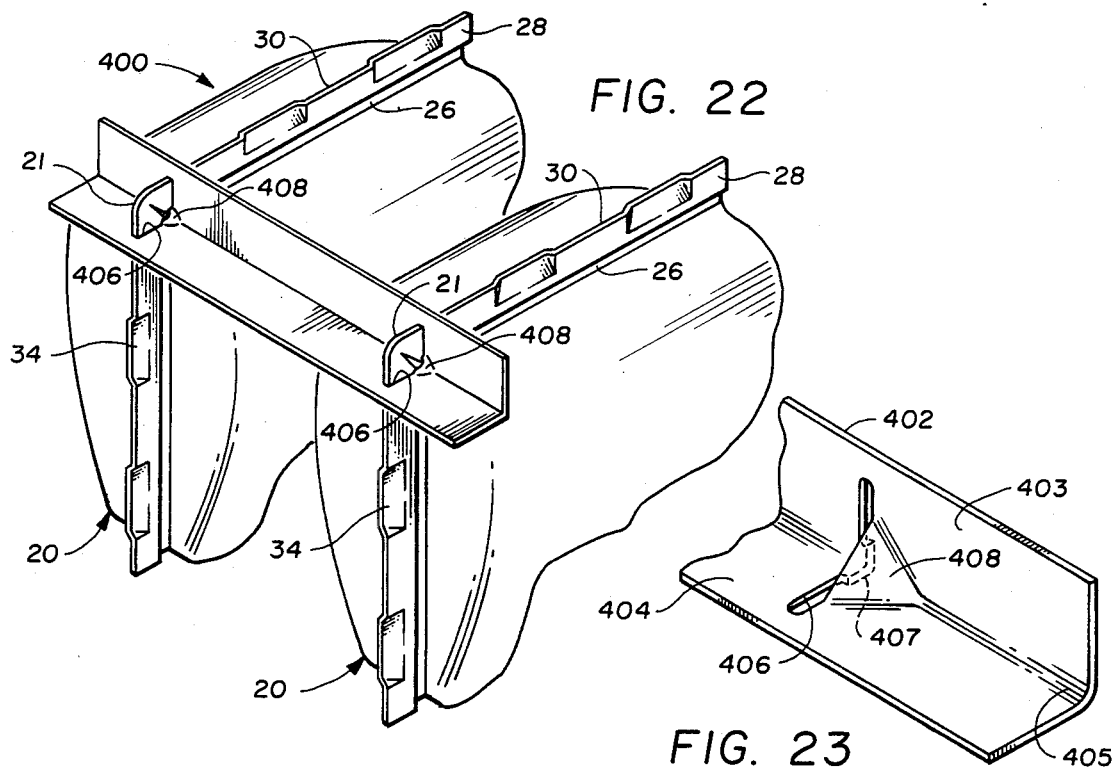
*FIG. 22*
*FIG. 23*

HEAT EXCHANGER AND PLATE ASSEMBLY AND METHOD OF MANUFACTURE

CROSS-REFERENCE TO RELATED APPLICATION

This application is a continuation-in-part of prior co-pending application Ser. No. 329,778, filed: Dec. 11, 1981 now U.S. Pat. No. 4,547,943 issued Oct. 22, 1985, which is a division of application Ser. No. 178,337, filed: Aug. 15, 1980, now abandoned.

TECHNICAL FIELD

This invention pertains to a furnace heat exchanger and support plate assembly which is assembled by rigid pressed joints between the burner and flue gas openings in the heat exchanger and cooperating openings in a support plate member.

BACKGROUND OF THE INVENTION

In the manufacture of gas fired hot air furnaces, it is known to fabricate the furnace heat exchangers by forming opposed dish shaped or clamshell sheet metal members which are joined face-to-face to form an enclosure or combustion chamber. Conventional practice in the art of heat exchanger fabrication has been characterized by welding the perimeter seam between the two clamshell sections to form an integral heat exchanger part and by assembling one or more of the heat exchanger parts to an additional structure such as a partition plate having openings corresponding to the burner and flue gas openings in the heat exchanger. Welding processes are disadvantageous in that they are expensive, time consuming and create several environmental problems which are hazardous to production personnel and contribute to the overall expense of manufacturing heat exchangers.

One improvement in the art of manufacturing the subject type of heat exchanger is described in U.S. Pat. No. 3,940,837 to John M. Wiese and assigned to the assignee of the present invention. In the Wiese patent, the heat exchanger is formed with a peripheral flange on the opposed clamshell sections which is inserted through an opening in the partition or support plate and is expanded or folded over against the surface of the plate adjacent the opening to secure the heat exchanger to the plate. A layer of insulation material is also preferably inserted between the plate and the heat exchanger flange. However, one drawback to the arrangement in the Wiese patent pertains to the tendency for the seams formed in the flange at the juncture between the opposed clamshell sections to split or open up during the flange deforming or folding process. This, of course, is detrimental to the structural integrity of the joint formed between the parts and provides a point of leakage of combustion gases from the heat exchanger.

Accordingly, there has been a need to improve on the configuration of the joint formed between a heat exchanger of the general type described herein and a supporting plate member. The high volume production requirements for such parts and the configuration of the parts themselves has also led to a need for an improved process of assembling a clamshell type heat exchanger to a partition or support plate at the respective openings for the burner assembly and flue gas discharge. Moreover, the requirement to develop a suitable pressed joint heat exchanger and plate assembly has been accentuated by the successful development of the perimeter flange pressed joint disclosed and claimed in U.S. Pat. No. 4,298,061, also assigned to the assignee of this invention.

SUMMARY OF THE INVENTION

The present invention provides an improved heat exchanger and plate assembly for gas fired hot air furnace structures wherein a substantially rigid pressed joint is formed between one or more openings in a clamshell type heat exchanger and a partition or supporting plate therefor.

In accordance with one aspect of the present invention the heat exchanger is provided with an opening for insertion of a burner assembly, said opening having a peripheral rim. A plate is assembled to the heat exchanger at the opening by pressing a seamless peripheral flange delimiting an opening in the plate against the rim of the opening in the heat exchanger. Accordingly, the deformed member is a continuous uninterrupted part which is not susceptible to separation or splitting to create a possible weak or leaking joint.

In accordance with another aspect of the present invention there is provided a pressed joint between a pouch or partition plate and a corresponding opening in a heat exchanger wherein a peripheral flange formed around an opening in the plate is inserted into a cooperating opening in the heat exchanger and pressed or flared outwardly of the periphery of the opening to clinch the plate and heat exchanger in assembly in a manner which will form a leakproof joint and will resist any tendency for the connection between the plate and the heat exchanger to become loose from the extreme temperature cycles to which such assemblies are subjected.

In accordance with a further aspect of the present invention there is provided a method for forming a pressed joint between a heat exchanger and a so-called partition plate or pouch plate wherein a peripheral flange formed about an oval shaped opening in the plate is inserted into a corresponding opening in the heat exchanger and deformed or folded outwardly into engagement with the inner wall surface of a shoulder formed around the opening in the heat exchanger. In one preferred method in accordance with the invention the joint is formed around the oval shaped opening by a multiple jaw press or expander apparatus which is inserted through the opening in the plate and the heat exchanger, followed by radial outward expansion of the jaws to carry out the folding or deforming process, then retraction of the jaws to permit removal of the apparatus from the assembly. The expander apparatus is adapted for insertion and removal through an opening in the plate member and into the interior of the heat exchanger since access to the interior of the heat exchanger is limited due to its configuration.

The present invention further contemplates the provision of a heat exchanger assembly which does not require any welding operations to fabricate a multipart assembly. In particular, the formation of the clamshell heat exchangers without welding any of the seams or joints in the heat exchanger is enhanced by an improved arrangement of multiple heat exchangers which are further supported by an improved spacer member which is secured to the peripheral flange of each heat exchanger unit without welding or without the use of conventional mechanical fasteners.

Those skilled in the art of furnace heat exchangers and manufacturing methods therefor will appreciate the above-noted features of the improved heat exchanger and plate assembly of the present invention as well as the improved manufacturing method together with additional superior aspects of the invention upon reading the detailed description which follows in conjunction with the drawings.

BRIEF DESCRIPTION OF THE DRAWINGS

FIG. 8 is a detail section view taken along the line 8—8 of FIG. 4;

FIG. 9 is a side elevation, partially sectioned along line 9—9 of FIG. 10, of an apparatus for forming the pressed joint between a heat exchanger opening and the plate assembly in accordance with one method of the present invention;

FIG. 10 is a top end view of the apparatus of FIG. 9;

FIGS. 16 through 19 illustrate an alternate arrangement for forming a joint between a heat exchanger and plate in accordance with the present invention;

FIG. 20 is a longitudinal section view of a pressing apparatus for forming the joint shown in FIGS. 16 through 19;

FIG. 21 is an end view of the apparatus shown in FIG. 20;

FIG. 22 is a perspective view showing an arrangement for joining the heat exchanger units together at a side opposite the partition and support plate assembly; and FIG. 23 is a detail view of the support bracket shown in FIG. 22.

DESCRIPTION OF THE PREFERRED EMBODIMENTS

Figures 1, 2:
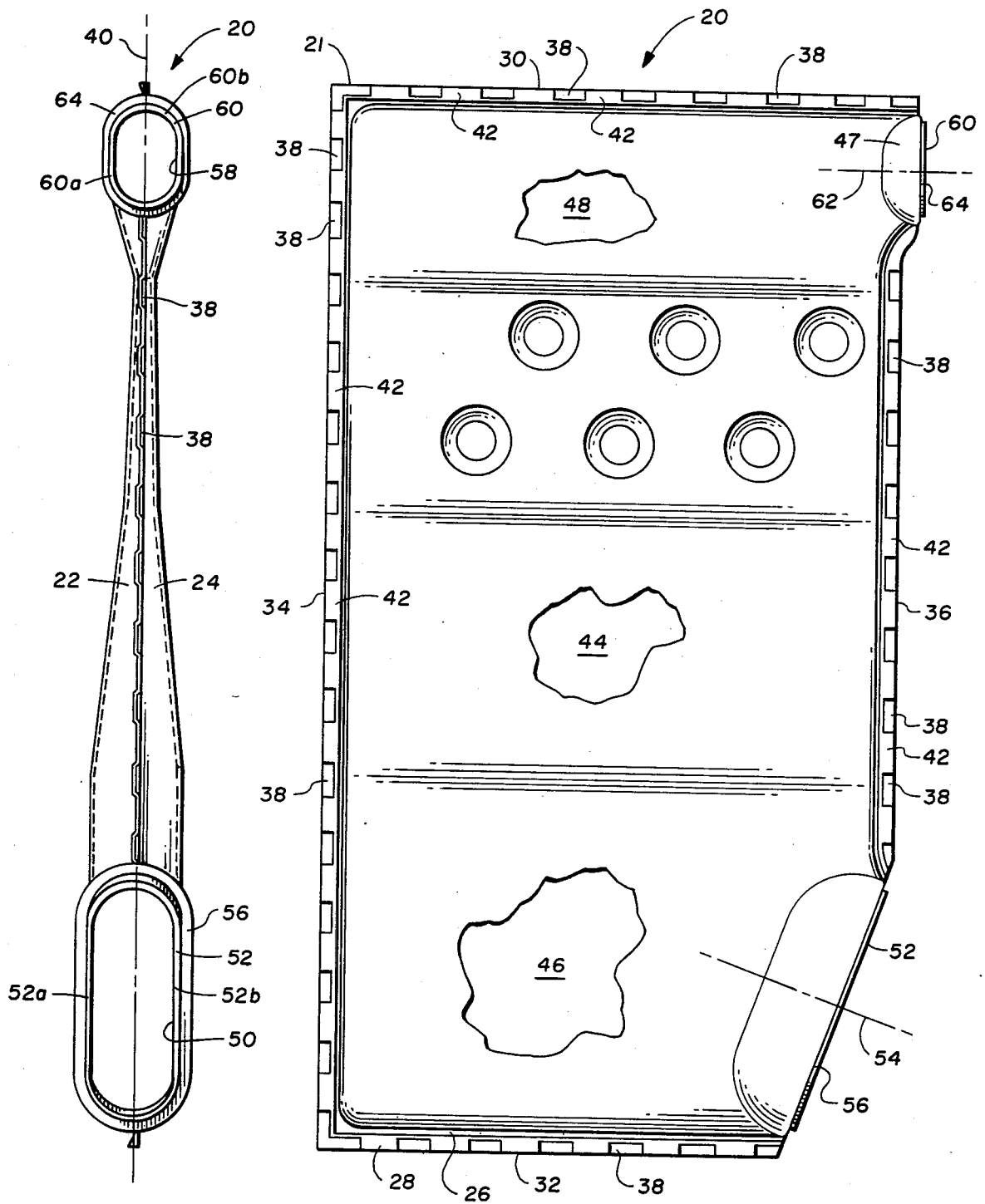
FIG. 1 is a side elevation of a heat exchanger unit for a gas fired furnace in accordance with the present invention.
FIG. 2 is an end elevation view of the heat exchanger unit.

In the description which follows, like parts are marked throughout the specification and drawings with the same reference numerals, respectively. The drawings are not necessarily to scale and certain features of the invention may be shown exaggerated in scale or in somewhat schematic form in the interest of clarity and conciseness.

Referring to FIGS. 1 and 2, there is illustrated a heat exchanger unit for a gas fired hot air furnace, generally designated by the numeral 20. The heat exchanger 20 is characterized by opposed deep drawn metal shell sections 22 and 24 which are formed of relatively light gauge steel, for example. The sections 22 and 24 are each formed with a perimeter flange 26 and 28, respectively, and are joined together face-to-face along said flanges in accordance with the arrangement disclosed and claimed in U.S. Pat. No. 4,298,061, to form a superior gastight joint between the sections.

Briefly, the improved joint is formed by folding the flange 28 over the flange 26 along a top edge 30, bottom edge 32 and opposed side edges 34 and 36, respectively, and then forming lengthwise spaced apart edge portions 38 which are displaced from a longitudinal central plane 40, FIG. 2, at an acute angle with respect to edge portions 42 extending between the edge portions 38 to prevent loosening of the joints between the clamshell sections 22 and 24 when the heat exchanger undergoes the extreme heating and cooling cycles to which such apparatus is normally subjected. The joining of the sections 22 and 24 forms an interior chamber 44 having an enlarged chamber portion 46 at the bottom portion of the heat exchanger and an enlarged chamber portion 48 at the top. An oval shaped opening 50 is formed in one end wall of the heat exchanger unit into the chamber portion 46 to provide for insertion of a burner assembly, not shown, of a conventional type known in the art of gas fired hot air furnaces. The oval opening 50 is formed with a rim 52 having complementary portions 52a and 52b formed on the respective sections 22 and 24, which form a continuous perimeter rim when the shell sections are joined together. The rim 52 is formed with a shoulder 56 joining the rim itself to the respective wall portions of the sections 22 and 24 and extending generally in a plane perpendicular to the central axis 54 of the opening 50.

The upper end of the heat exchanger 20 is provided with a second somewhat oval shaped opening 58 to provide an outlet for the chamber portion 48 for discharging combustion products from the heat exchanger. The opening 58 is delimited by a perimeter rim 60 having opposed portions 60a and 60b formed on the respective heat exchanger sections and extending generally parallel to a longitudinal central axis 62 of the opening 58. The rim 60 is also joined to the main portions of the sections 22 and 24 by an integral shoulder 64 which extends in a plane substantially perpendicular to the axis 62.

Figure 3:
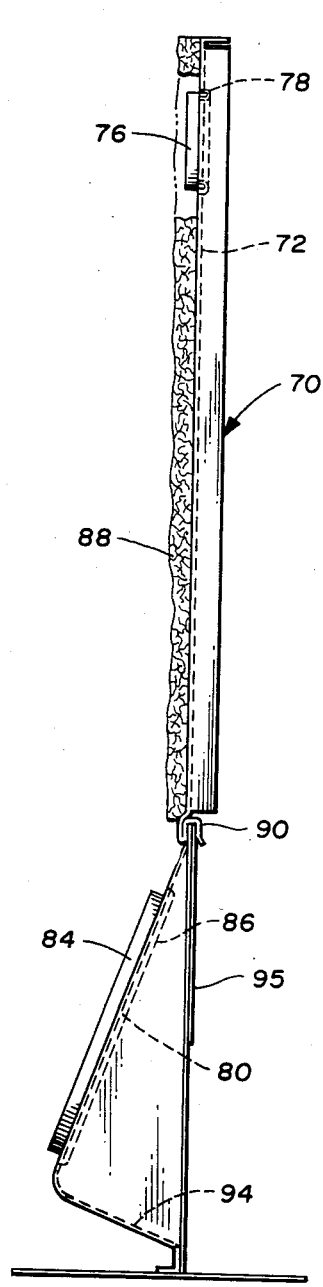
FIG. 3 is a side elevation of a plate assembly to which the heat exchanger unit is attached according to the present invention.
Figure 4:
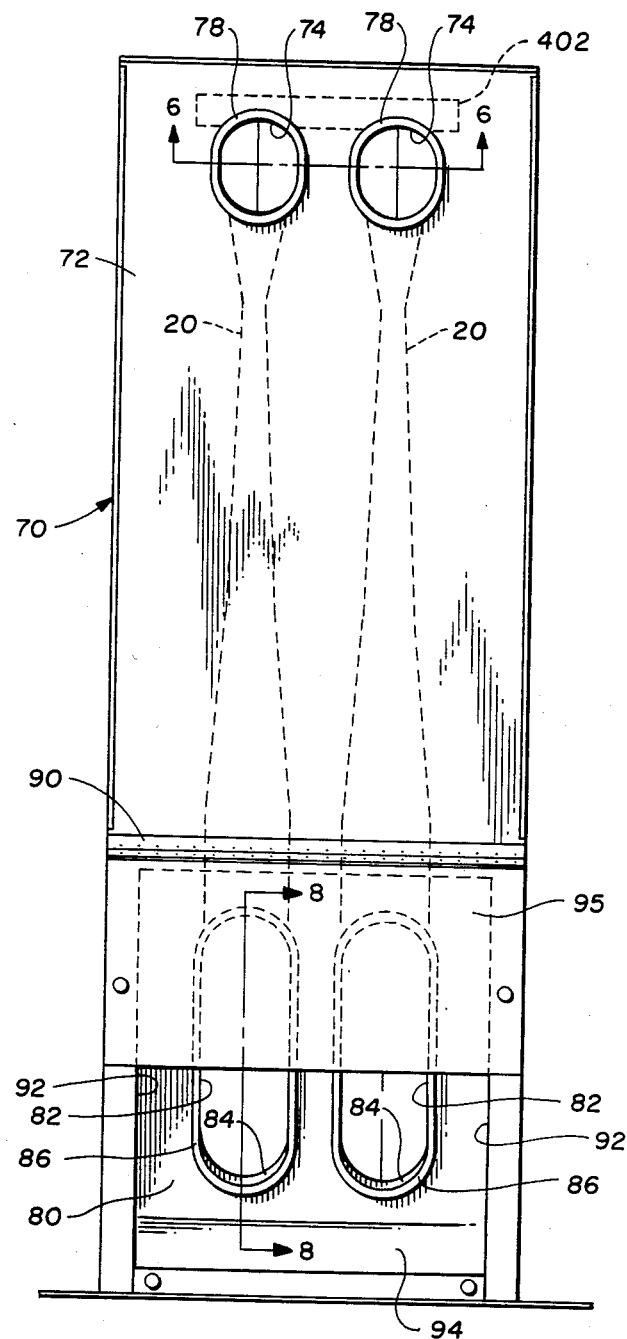
FIG. 4 is a front elevation of the plate assembly.

Referring now to FIGS. 3 and 4, there is illustrated a support plate assembly, generally designated by the numeral 70 for joining at least two heat exchanger units 20 in assembly therewith. The plate assembly 70 is adapted to be secured to an additional structure making up a furnace, not shown, in which the heat exchanger units 20 are used. The plate assembly 70 includes a partition plate 72 including spaced apart oval shaped openings 74 each delimited by a seamless perimeter flange 76 which is joined to the plate 72 by an integral annular channel shaped portion 78. The formation of the flange 76 including the channel shaped portion 78 may be carried out using substantially conventional steel press or drawing equipment.

The plate assembly 70 also includes a so-called pouch plate 80 which is also formed with spaced apart oval shaped openings 82 corresponding to the openings 50 in the respective heat exchanger sections and delimited by a seamless perimeter flange 84 extending substantially perpendicular to the plane of the pouch plate 80. The flanges 84 also include integral channel shaped portion 86 joining the respective flanges to the remainder of the pouch plate 80. The plate assembly 70 may take various forms and may, for example, include a layer of insulating material 88 attached to the side of the plate assembly to which the heat exchanger units are to be secured. The plate assembly 70 may be formed as an integral unit or may comprise a separate partition plate section 72 and pouch plate section 80 joined together along a joint 90. The pouch plate 80 may also be formed as a somewhat pan shaped member having opposed sidewalls 92 a bottom wall portion 94 and a separate cover plate 95, as shown, to provide a space for portions of the aforementioned burner assemblies, not shown. In FIG. 4 the heat exchanger units 20 are shown in their assembled position with respect to the plate assembly 70.

Figure 5:
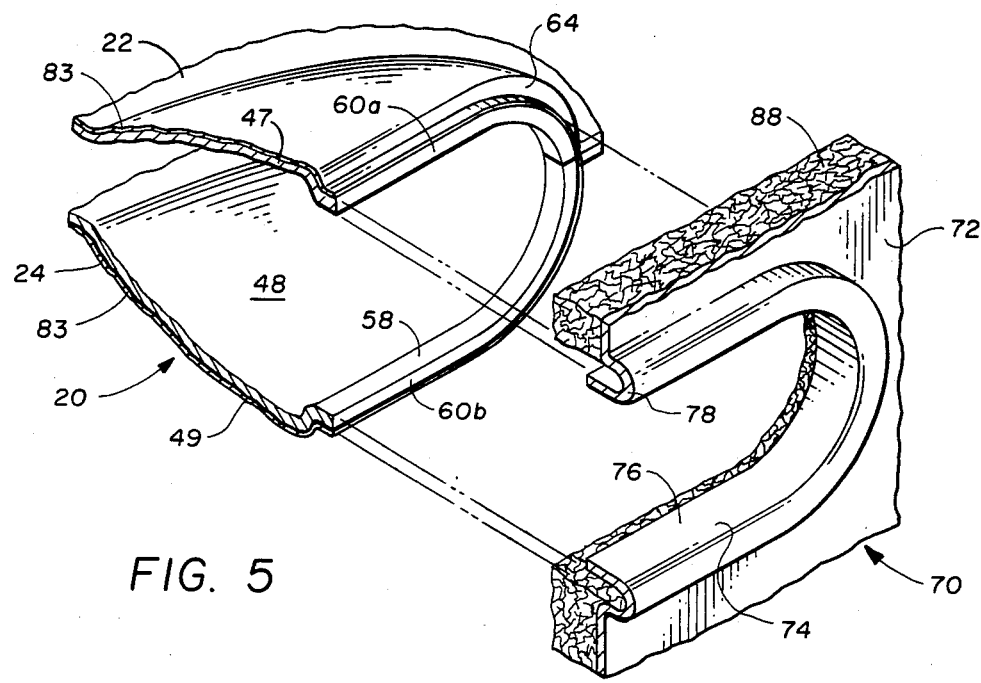
FIG. 5 is a fragmentary exploded perspective view showing the cooperating portions of a partition plate and a heat exchanger unit at the combustion gas outlet opening.
Figure 6:
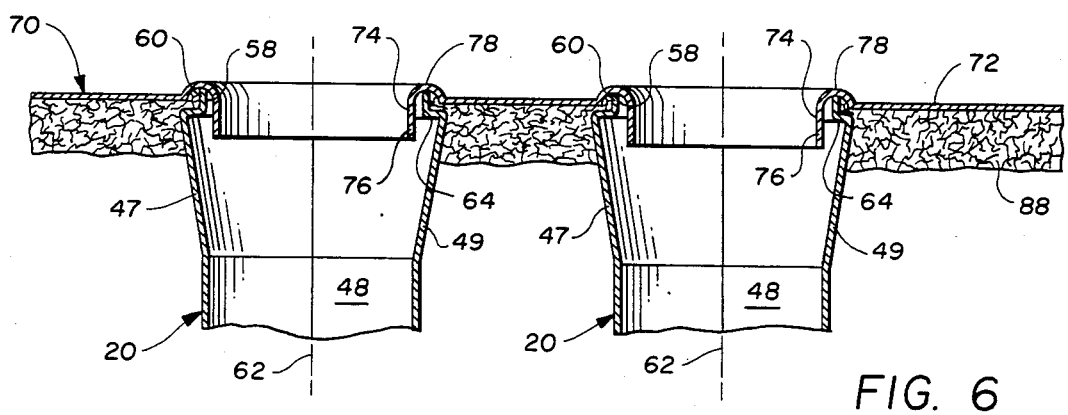
FIGS. 6 and 7 are sectional views taken on the plane of line 6—6 of FIG. 4 illustrating the steps in the formation of a leakproof rigid pressed joint at the combustion gas outlets of the heat exchanger assembly.

Referring now to FIGS. 5 and 6, by way of example, the partition plate 72 is shown positioned such that each of the continuous flanges 76 project into the associated openings 58 in the respective heat exchanger units 20 positioned side-by-side in preparation for the joining operation of the plate assembly to the heat exchanger units. As illustrated in FIG. 6, the respective rims 60 project into cooperating continuous oval shaped recesses formed by the channel shaped portions 78 of the flanges 76. In contrast with prior art arrangements of joining heat exchangers to cooperating supportive plate members, the continuous seamless flanges 76 are each folded radially outwardly with respect to the longitudinal central axes 62 into tight engagement with the inner wall surface of the shoulders 64 formed around the openings 58.

Figure 7:
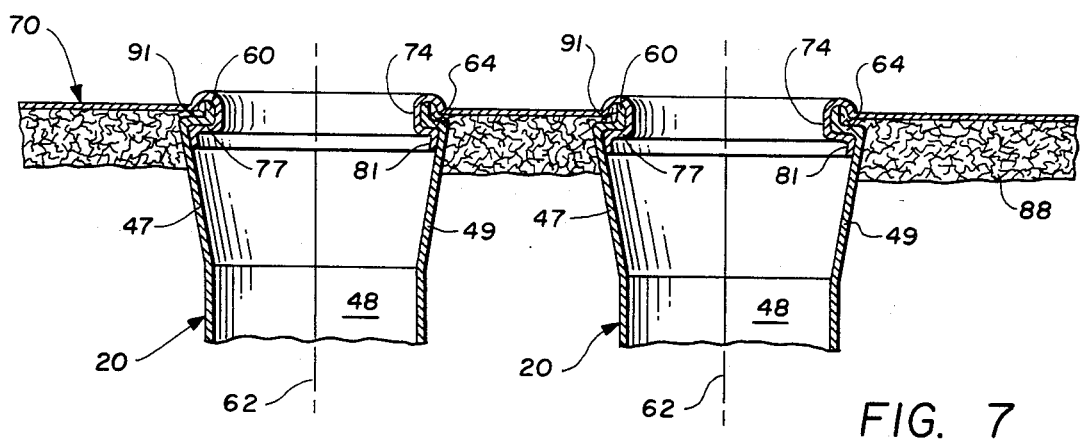

The final secured position and shape of the flanges 76 is illustrated in FIG. 7 wherein, as shown, the recesses formed by the channel shaped portions 78 are closed. Moreover, the distal ends of the flanges 76 are caused to be contiguous with the shoulders 64 and sidewall portions 47 and 49 of the respective shell sections 22 and 24. Accordingly, a shoulder 77 is formed on the flanges 76 and a distal end portion 81 is formed conforming to the oval shaped opening formed by the sidewalls 47 and 49. As indicated in FIG. 7, it may also be desirable to provide for trapping a small portion of insulation 91 between the plane of the partition plate 72 and the shoulder 64 formed by the rims 60. Alternatively, a bead of high temperature sealant may also be provided around the outside surface of the shoulders 64 to form a gasket upon closure of the joint.

The displacement of the flanges 76 as described above provides several advantages in providing a leakproof joint in a furnace heat exchanger and plate assembly. The folding or displacement of the flanges 76 are advantageous in that these flanges are seamless and there is no tendency for a seam to open during the material displacement process to thereby form a point of fluid leakage through the joint. Moreover, the surfaces of the heat exchanger units are preferably provided with a porcelain enamel coating 83, FIG. 5, which reduces corrosion and enhances the heat transfer characteristics of the units. Substantial displacement of heat exchanger material in the vicinity of the rims 60 would tend to break such coatings, particularly if they are brittle in nature, such as the aforementioned porcelain type coating typically used in conjunction with furnace heat exchanger units. Accordingly, the heat exchanger units 20 can be processed to have the coating 83 applied before the plate assembly 70 is joined to the heat exchanger units and it is not necessary to coat the entire assembly after the joining operations.

Referring briefly to FIG. 8, the joint formed between the pouch plate 80 and each of the heat exchanger units 20 is of a similar configuration. In joining the plate assembly 70 to the respective heat exchanger units, both units and the plate assembly are preferably mounted in suitable fixtures, not shown, with the flanges 76 and 84 projecting into the respective openings 58 and 50. In regard to the joint formed between the pouch plate 80 and the heat exchanger units 20 the rims 52 extend into annular recesses formed by the channel shaped portions 86 of the flanges 84. As indicated in FIG. 8, a small amount of insulating material 88 may be trapped between the shoulder 56 and the plate 80, if desired, or the rim 52 may be dimensioned such that the shoulder 56 will be flush or contiguous with the plane of the plate 80 when the flanges 84 are folded radially outwardly with respect to the axes 54. The plastic deformation of the flanges 84 into the configuration illustrated in FIG. 8, by way of example, forms a radially outwardly extending shoulder 89 and a generally axially extending distal end portion 93 of the flange. Accordingly, a joint similar to that previously described for the openings 58 is formed which is gas tight and basically requires only the displacement of a seamless member to minimize the chance of joint leakage. Moreover, the rigidity of the joint formed as described is greater than joints wherein the flange or rim around the heat exchanger opening is displaced or folded over a planar surface. This rigidity is due in part to the displacement of material in two directions as indicated by the formation of the shoulder 89 and the distal end portion 93. The above-mentioned type of joint maintains its integrity to a greater degree than prior art weldless joints when subjected to the extreme cycles of temperature change associated with furnace heat exchangers.

Figure 11:
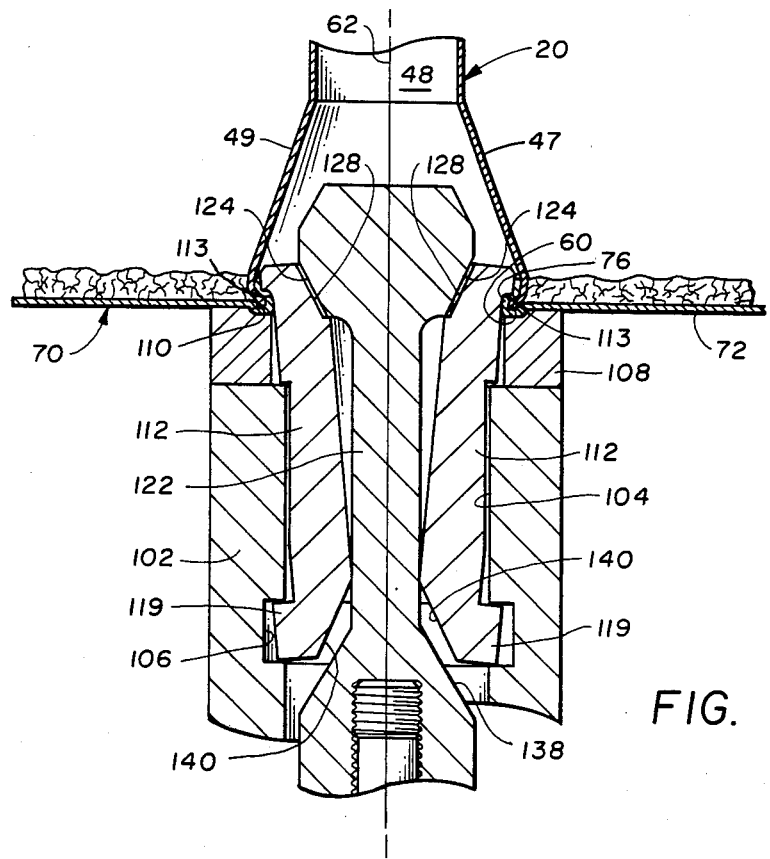
FIG. 11 is a section view taken along line 11—11 of FIG. 10 and showing the apparatus of FIGS. 9 and 10 forming a pressed joint between the heat exchanger and the partition plate.

The formation of the rigid pressed joints between the flanges 76 and 84 and the associated rims of the heat exchanger units 20 is carried out in a particularly unique manner. The displacement of the flanges 76 and 84 is particularly difficult since access to the flanges must be obtained through the respective openings delimited by the flanges. This is due to the fact that there is virtually no access to the vicinity of the flanges from within the chambers 46 and 48 due to the nature of the closure formed by the heat exchanger shell sections. Referring now to FIGS. 9, 10 and 11, there is illustrated one embodiment of an apparatus for forming the joints described between the plate assembly 70 and the respective heat exchanger units 20. The apparatus illustrated in FIGS. 9 and 10 comprises an expander mechanism, which for the sake of description will be referred to in regard to forming the joints at the smoke or combustion products outlet openings 58. The expander for the openings 58 is generally designated by the numeral 100 and comprises a body member 102 having a bore 104 with an annular recess 106 formed therein. The body member 102 includes a separable die part 108 having an oval shaped bore 109 and a recess or groove 110 for receiving the channel shaped portions of the flange 76 as shown in FIG. 11. The expander 100 is further characterized by four expander jaw segments 112 and 114. The respective segments 112 and 114 are arranged in opposed relationship to each other and are each provided with a curved surface 113 and 115, respectively for engagement with the sidewalls of the flanges 76 to displace the flanges radially outwardly to form the shoulders 77 in response to radial movement of the respective jaw portions outwardly with respect to longitudinal axis 62.

The respective jaws 112 and 114 each include radially projecting shoulder portions 119 and 121 which project into the recess 106 when the jaw members are assembled in the bore 104 of the body 102. The jaws 112 and 114 are adapted to be engaged by a mandrel 122 having opposed surface portions 124 and 126 engageable with cooperating cam surfaces 128 and 130 on the respective jaw members 112 and 114. The mandrel 122 is connected to the piston rod 132 of a conventional double acting pressure fluid cylinder and piston assembly 134 suitably mounted on a flange 136 of the body member 102. The cylinder assembly 134 is adapted to be connected to a source of hydraulic fluid, not shown, and to be actuated to move the mandrel axially along the axis or centerline 62, FIG. 11.

In the position illustrated in FIG. 9 the expander 100 is adapter to be inserted through the opening 58 and the apparatus is located with respect to the plate assembly 70 by moving the die member 108 into registration of its groove 110 with the channel shaped flange portions 78. With the jaw members 112 and 114 in the retracted position shown the jaws and the mandrel 122 may be inserted through the cooperating openings in the plate 72 and the heat exchanger 20 into a flared portion of the chamber 48, as illustrated in FIG. 11. Upon actuation of the cylinder 134 to draw the mandrel 122 downwardly, viewing FIGS. 9 and 11, toward the jaws 112 and 114, the cooperating cam surfaces between the mandrel and the respective jaw members become engaged and the jaws are moved radially outwardly to displace the flange 76 into the position shown in FIGS. 7 and 11. By actuating the cylinder 134 to move the mandrel in the reverse direction, a somewhat conical shaped cam surface 138 on the mandrel base engages cooperating surfaces 140 and 142 on the jaws to retract the jaws into the position shown in FIG. 9. Accordingly, the expander 100 can be inserted through the openings formed in the plate assembly 70 and withdrawn from same.

Figure 12:
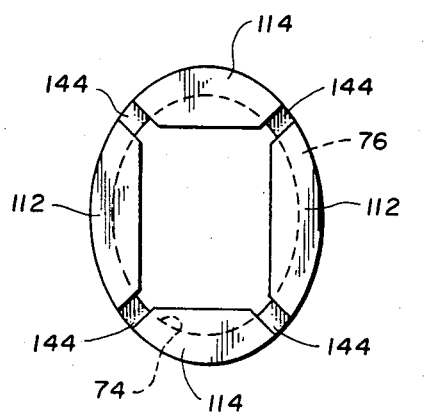
FIGS. 12 and 13 are diagrams showing the jaw patterns of the apparatus illustrated in FIG. 9 and of a similar apparatus for completing the pressing operation.
Figure 13:
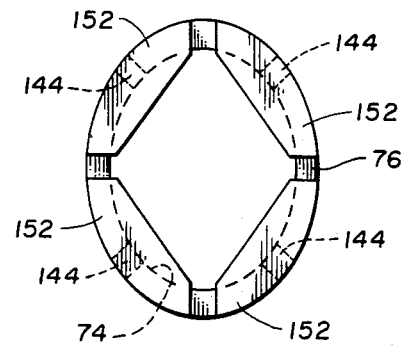

Referring now to FIG. 12 there is illustrated a diagram of the contact pattern formed by the jaw surfaces 113 and 115 as the jaws move radially outwardly to engage and displace the flange 76. The radial outward movement of the respective jaws 112 and 114 results in four circumferentially spaced apart areas 144 on the flange 76 which are not folded tight against the shoulder 64 of the rim 60. Accordingly, upon withdrawal of the expander 100 from the heat exchanger openings, a second expander, having a set of jaws of a different pattern and which overlap the areas 144, is inserted into the opening in the plate 72 and engaged with the flanges 76 to fully crimp or fold the flanges in the areas 144 to be substantially planar with the areas folded by the jaws 112 and 114. FIG. 13 illustrates the pattern of opposed jaws 152 which are operable when used in conjunction with an apparatus substantially similar to the apparatus 100 to form the final clinching or folding operation to provide a leakproof joint between the plate assembly and the heat exchanger at the combustion products outlet openings 74 and 58.

Figure 14:
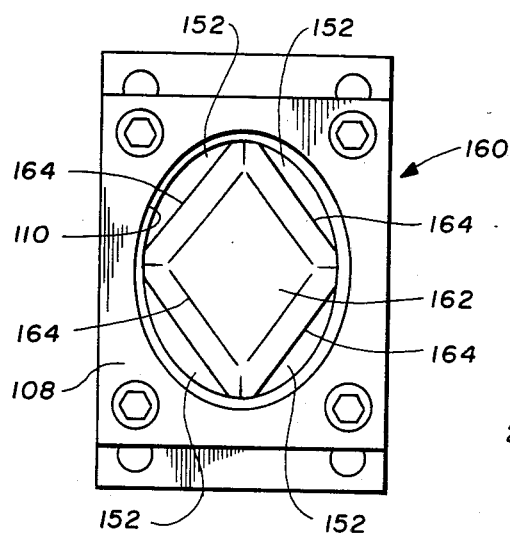
FIG. 14 is an end view of an apparatus similar to that shown in FIGS. 9 and 10 and having the jaw pattern of FIG. 13.

Referring briefly to FIG. 14, there is illustrated an end view of an expander apparatus 160 similar in substantially all respects to the expander apparatus 100 except that a modified mandrel 162 is provided which has cooperating opposed cam surfaces 164, the edges of which are shown in the drawing figure. The cam surfaces 164 are engageable with cooperating surfaces on the respective jaws 152 to expand the jaws radially outwardly into the position illustrated in FIG. 13 to perform the final clinching or expanding of the areas 144 previously described.

Those skilled in the art will appreciate that similar expander apparatus may be used to displace the flanges 84 to form the joints between the pouch plate 80 and the heat exchanger units at the respective openings 50 and 82. The joint forming operations may be carried out simultaneously on suitable apparatus supporting a plurality of expander devices corresponding in number to the number of openings in the plate assembly.

Figure 15:
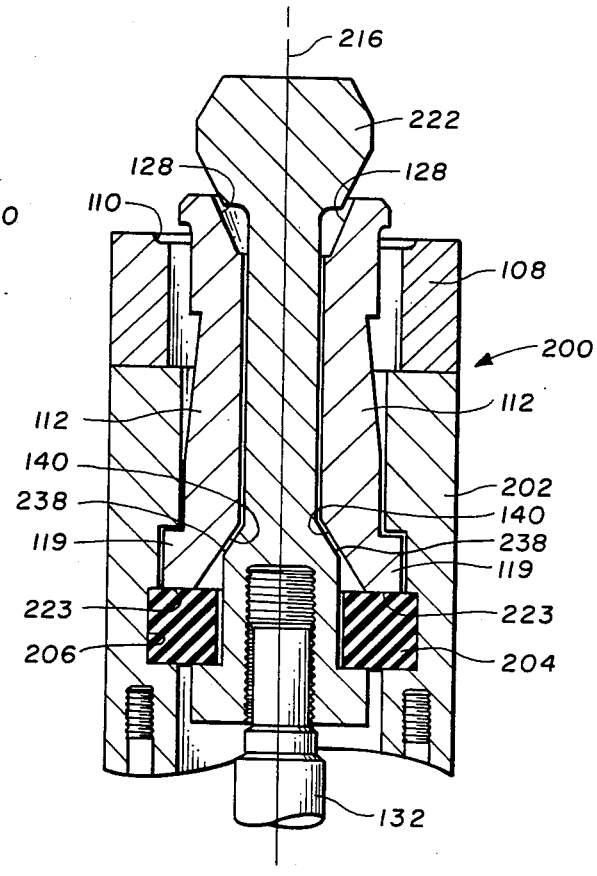
FIG. 15 is a longitudinal section view of a portion of an alternate embodiment of a pressing apparatus.

Referring now to FIG. 15, there is illustrated another modified arrangement of an expander, generally designated by the numeral 200, which is similar to the apparatus or device 100 and 160 except that a modified body 202 is provided which has an elastically deformable block 204 disposed in a circumferential groove 206. In the arrangement of the expander 200 actuation of the cylinder assembly to move piston rod 132 to draw mandrel 222 downwardly, viewing FIG. 15, will first result in radial outward displacement of the opposed jaw members 112 and 114 as occurs with the expander 100. However, continued axial downward displacement of the mandrel 222 will result in forcible engagement of cooperating shoulders 223 on the respective jaws with the block 204 resulting in some axial displacement of the jaws along the axis 216 downward, viewing FIG. 15, to assure that the plate flange 76 is brought into registration with the shoulder 64, for example, to form a leakproof joint. Thanks to the provision for axial displacement of the jaws 112 and 114 by deforming the block 204 the expander 200 will accommodate variations in metal thickness of the plate assembly 70 and the heat exchanger rim portions 52 and 60. Accordingly, this arrangement will accommodate dimensional tolerances in sheet metal thicknesses or the expander 200 may be used in conjunction with assembling heat exchanger units of varying metal thickness.

The expander units 100 and 200 are substantially similar in construction and operation except for the aforementioned provision of the deformable annular block or body member 204 which permits axial movement of the jaws along the axis 216 after completion of the radial outward displacement of the jaws. In a procedure utilizing the expander apparatus 200 it would normally be necessary and desirable to insert a second expander of similar construction but having the different jaw pattern as discussed above in conjunction with FIGS. 12 and 13 to displace the flanges in the areas 144 which were not fully clinched or folded during the first stage of the process.

A further modification of the present invention is illustrated in FIGS. 16 through 21. Referring to FIGS. 20 and 21, there is illustrated a joint expanding and forming apparatus, generally designated by the numeral 300 having a body member 302 with an oval longitudinal bore 304. The body member 302 is suitably connected to a hydraulic cylinder and piston assembly, not shown, similar to the cylinder assembly 134 and having a piston rod 306 which is connected to a mandrel 308.

The mandrel 308 includes a transverse flange portion 309 and a shank portion 310 having a somewhat truncated pyramidal shape. The mandrel 308 is surrounded by four curling jaw members 312 and 314, opposed ones of which are of the same shape and which are radially expandable outwardly to engage the flange and rim joint previously described. The jaw members 312 and 314 are biased toward engagement with the flange 309 by coil springs 316 disposed in the bore 304 and interposed between a movable support plate 318 for the bases of the respective jaw members and an end plate 317. The jaw members 312 and 314 are each provided with depending key portions 319 and 321 which are disposed in opposed slots 323 and 325 in the plate 318.

The jaw segments 312 and 314 are adapted to move radially outwardly into engagement with the flange 76 in response to downward axial displacement of the mandrel 308, viewing FIGS. 16 through 20, as previously described. Continued axial displacement of the mandrel 308 moves the jaw members 312 and 314 axially in the oval bore 304 so that a curling action of the distal edges of the aforementioned flanges may be carried out to press the flanges tightly into engagement with the cooperating shoulder formed by the rim of the opening in the heat exchanger assembly.

Referring now to FIGS. 16 through 19, in particular, there is shown the formation of a joint in accordance with a method utilizing the expander apparatus 300. Only a partial half section of the joint is shown in the interest of clarity and conciseness. In forming an opening between a partition plate 72 and a heat exchanger unit 20 a modified rim configuration defining the smoke outlet opening 58 is provided with the profiles illustrated in FIGS. 16 through 19. The rim 60c has a relatively generous curved radius 63 formed between the axially projecting rim portion and the transverse shoulder 64a. The flange 76, including the channel shaped portion 78, is supported by a die member 311 having an oval recess 303 as shown. A resilient ring member 333 is disposed in a groove in the die member 311 for engagement with the plate member adjacent to the groove 303. In FIGS. 16 through 19 a typical one of the curling jaw members 312 is shown in detail and is provided with the curved curling surface portion 313 which blends into an axially extending portion 315. The jaws 312 and 314 may be retracted by axial upward extension of the mandrel 308 to move the jaws radially inward towards the axis under the urging of a garter spring 327, FIG. 20, disposed in cooperating grooves formed in each of the jaw members. With the jaws 312 and 314 retracted radially inwardly toward each other the jaws and the head of the mandrel 308 may be inserted through the opening 74 and positioned as indicated in FIG. 16.

Actuation of the cylinder to draw the mandrel 308 downwardly, viewing FIGS. 16 through 20, will effect radial outward displacement of the jaws 312 and 314 until the surfaces of the jaws engage a sidewall portion 331 forming an oval shaped bore in the die member 311. The jaws 312 and 314 and the mandrel 308 are proportioned such that the top transverse surfaces of the jaws will engage the flange 309 when the jaws are also just in light contact with the borewall 331. Continued axial displacement of the mandrel 308 downwardly, viewing FIG. 18, will result in engagement of the distal edge of the flange 76 by the surface 313 to commence a radially outwardly directed expansion or curling action on the flange. As the jaws 312 and 314 are moved to the position shown in FIG. 19, the flange 76 is curled radially outwardly and forcibly engaged with the shoulder 64a to the extent that partial displacement of metal of the flange distal end into the shoulder 64a and of the distal edge of rim 60c into the channel portion 78 may be incurred to lock or clinch the flange in the expanded position shown.

After clinching the flange 76 by the respective jaw members 312 and 314, simultaneously, the jaw members may be retracted by extending the mandrel 308 upwardly whereby the garter spring 327 will force the jaw members radially inward toward each other and toward the axis 326, FIG. 20. The expander apparatus 300 may then be withdrawn from the opening 74 and a secondary expansion operation performed in accordance with the previous description to clinch the areas on the circumference of the expanded flange 76 which were not engaged directly by the curling jaws 312 and 314. The expander apparatus 300 is, of course, also adapted to accommodate dimensional variations in the thickness of the flanges 76 and the rims 60c due to the combined radial and axial movement of the jaws 312 and 314.

Referring now to FIG. 22, there is shown a perspective view of a portion of a complete heat exchanger and plate assembly, generally designated by the numeral 400 wherein the respective heat exchanger units 20 are rigidly interconnected in each other at the corner formed by the edges 30 and 34 opposite the plate assembly 70. As shown in FIGS. 22 and 23 the respective heat exchanger units 20 are secured together spaced apart by an elongated "L" shaped support member 402 having opposed legs 403 and 404 extending at substantially perpendicular to each other. Referring also to FIG. 23, the member 402 is provided with spaced apart transversely extending notches 406, one shown, which are each provided with a tang 407 and a somewhat triangular shaped gusset 408 disposed opposite the tang 407 and formed by displacing metal along a longitudinal side of the notch 406 into a plane which intersects the planes of the legs 403 and 404. The notch 406 may be punched out with the member 402 in a planar configuration before the formation of the legs 403 and 404 which may be carried out by bending the member along a longitudinal line 405. Upon bending the member 402 to the configuration shown in FIG. 23 the gusset portions 408 may be formed by displacing material opposite the tangs 407. The spacing of the notches 406 is, of course, equal to the desired spacing of the respective heat exchanger units 20.

Upon assembly of the heat exchanger units 20 to the plate assembly 70 or, conversely, prior thereto, the heat exchanger units may be secured together at a predetermined spacing by insertion of the corners 21 into the respective notches 406, as shown in FIG. 22. The gusset portions 408 may then be bent inwardly towards the line of intersection 405 to clinch the flanges of the respective heat exchanger units securely in the notches. Accordingly, the present invention also provides a furnace heat exchanger assembly including plural heat exchanger units, a support plate assembly, and supporting members which are all secured together without requiring any welding or brazing operations.

The improvements realized by the apparatus and methods of the present invention will be recognized and appreciated by those skilled in the art, and it will be further recognized that various substitutions and modifications may be made to the specific embodiments described herein without departing from the scope and spirit of the invention as recited in the appended claims.

What I claim is:

1. A heat exchanger assembly for a gas fired furnace and the like comprising:
    a heat exchanger unit including opposed clamshell sections joined to each other to form an enclosure defining a combustion chamber;
    an opening into said chamber delimited by a substantially continuous rim formed by wall portions of said opposed sections, said rim being delimited by means forming a shoulder extending in a radial direction internally around said opening in said heat exchanger unit; and
    a plate member having an opening therein corresponding to said opening in said heat exchanger unit and delimited by a seamless flange extending around said opening in said plate member, said flange being proportioned to fit within said opening in said heat exchanger unit, extending into said chamber and folded radially outwardly with respect to a central axis of said opening in said plate member into an expanded metal engagement with a backsurface of said means forming said shoulder in said heat exchanger unit to form a substantially rigid leakproof joint between said heat exchanger unit and said plate member.

2. The heat exchanger assembly set forth in claim 1 wherein:
    said flange is folded radially outwardly and a distal edge of said flange is folded in another direction.

3. The heat exchanger assembly set forth in claim 1 wherein:
    said flange includes an annular channel shaped portion integrally joining said flange to said plate member and forming a recess for receiving a distal end of said rim whereby upon folding said flange the distal end of said rim is sandwiched tightly between the sides of said channel shaped portion of said flange.

4. A heat exchanger assembly for a furnace including a plurality of elongated heat exchanger units each formed by opposed sheet metal sections which are secured together along a perimeter flange to form an enclosed combustion chamber, an opening formed along one end wall of each of said heat exchanger units near the bottom of said combustion chamber for receiving a burner assembly, a smoke outlet opening in said one end wall at the top of said combustion chamber, each of said openings being delimited by perimeter rim portions extending generally parallel to the central axes of said openings, respectively, and means forming a shoulder extending in a radial direction internally around said openings, respectively, and a plate assembly for attachment to said heat exchanger units whereby said heat exchanger units are disposed side-by-side with respect to each other, said plate assembly including spaced apart openings formed therein and corresponding to the respective openings in said heat exchanger units, respectively, said openings in said plate assembly being delimited by flanges extending generally perpendicular to the plane of said plate assembly adjacent to said respective openings, said respective flanges extending into the corresponding openings formed in said heat exchanger units and being deformed outwardly of said openings in said plate assembly into an expanded metal engagement with a back surface of said shoulders, respectively, internally of said heat exchanger openings to form leakproof joints between said plate assembly and said heat exchanger units at said openings and for supporting said heat exchanger units with respect to said plate assembly.

5. The heat exchanger assembly set forth in claim 4 wherein:
    said openings are substantially oval shaped and said flanges are formed integral with said plate assembly and are seamless.

6. The heat exchanger assembly set forth in claim 4 wherein:
    said heat exchanger units are covered with a brittle coating.

7. A heat exchanger assembly for a furnace comprising a heat exchanger unit formed by a sheet metal structure forming an enclosed combustion chamber, an opening formed along a wall of said heat exchanger unit near the bottom of said combustion chamber for receiving a burner assembly, a smoke outlet opening in a wall of said heat exchanger unit at the top of said combustion chamber, each of said openings being delimited by perimeter rim portions extending generally parallel to the central axes of said openings, respectively, and a plate assembly for attachment to said heat exchanger unit, said plate assembly including spaced apart openings formed therein and corresponding to the respective openings in said heat exchanger units, said openings in said plate assembly being delimited by seamless flanges extending generally perpendicular to a plane of said plate assembly in the vicinity of said respective openings in said plate assembly, said respective flanges extending into the corresponding openings formed in said heat exchanger unit and having distal end portions deformed in a direction radially outward of said openings in said plate assembly into a backside engagement with said walls of said said heat exchanger unit around said perimeter rim portions, respectively, to form leakproof joints between said plate assembly and said heat exchanger unit.

8. The heat exchanger assembly set forth in claim 7 wherein:
    said openings in said heat exchanger unit and said plate assembly are substantially oval shaped and said flanges are formed integral with said plate assembly.

9. A method of securing a heat exchanger unit for a furnace to a plate member, comprising the steps of:
    providing said heat exchanger unit as a relatively thin walled sheet metal structure defining a chamber for the flow of fluid to be in heat exchange relationship with the walls of said heat exchanger unit and, at least one opening into said chamber through a wall of said heat exchanger unit;
    providing a plate member including an opening corresponding to said opening in said heat exchanger unit and defined by a seamless perimeter flange projecting from the plane of said plate member;
    providing a tool including a plurality of radially expandable and contractable jaw members;
    inserting said flange into said chamber through said opening in said heat exchanger unit;
    inserting said tool through said opening in said plate member and then into said chamber;
    expanding said jaw members radially outward into engagement with said flange to bend said flange into engagement with an inner wall surface of said heat exchanger unit at the periphery of said opening in said heat exchanger unit to form a substantially rigid leakproof joint between said heat exchanger unit and said plate member; and contracting said jaw members and removing said tool from said chamber through said opening in said plate member.

10. A method of securing a heat exchanger unit for a furnace to a plate member, comprising the steps of:
providing said heat exchanger unit as a relatively thin walled sheet metal structure defining a chamber for the flow of fluid to be in heat exchange relationship with the walls of said heat exchanger unit and at least one opening into said chamber through a wall of said heat exchanger unit;
providing a plate member including an opening corresponding to said opening in said heat exchanger unit and defined by a perimeter flange projecting from a plane of said plate member;
providing apparatus comprising a mandrel, a plurality of jaw members disposed to be engaged by said mandrel to move said jaw members radially outward with respect to said mandrel, said jaw members including surface means engageable with said flange, means for retracting said jaw members radially inward toward said mandrel, and means for actuating said mandrel;
inserting said flange through said opening in said heat exchanger unit;
inserting a portion of said apparatus including said jaw members through said opening in said plate member;
actuating said jaw members to move radially outwardly into engagement with said flange;
bending said flange with said jaw members into engagement with said heat exchanger unit at the periphery of said opening in said heat exchanger unit to form a joint between said heat exchanger unit and said plate member;
actuating said jaw members to retract radially inwardly; and
withdrawing said apparatus from said opening in said plate member.

11. A heat exchanger assembly for a furnace including a plurality of elongated heat exchanger units each formed by opposed sheet metal sections which are secured together along a perimeter flange to form an enclosed combustion chamber, an opening formed along one end wall of each of said heat exchanger units near the bottom of said combustion chamber for receiving a burner assembly, a smoke outlet opening in said one end wall at the top of said combustion chamber, each of said openings being delimited by perimeter rim portions extending generally parallel to the central axes of said openings, respectively, a plate assembly for attachment to said heat exchanger units whereby said heat exchanger units are disposed side-by-side with respect to each other, said plate assembly including spaced apart openings formed therein and corresponding to the respective openings in said heat exchanger units, respectively, said openings in said plate assembly being delimited by flanges extending generally perpendicular to the plane of said plate assembly adjacent to said respective openings, said respective flanges extending into the corresponding openings formed in said heat exchanger units and being deformed outwardly of said openings in said plate assembly into engagement with said heat exchanger units to form leakproof joints between said plate assembly and said heat exchanger units at said openings and for supporting said heat exchanger units with respect to said plate assembly, and a support member for securing said heat exchanger units interconnected at respective predetermined points on said perimeter flanges of each of said heat exchanger units, said support member comprising an angle section having spaced apart slots formed therein, a gusset portion of said support member adjacent each of said slots being formed to permit insertion of said perimeter flange into said slot and said gusset portion being deformable in a direction to forcibly engage and lock said perimeter flange in engagement with said support member.

12. A heat exchanger assembly for a furnace including a plurality of elongated heat exchanger units each formed by opposed sheet metal sections which are secured together along a perimeter flange to form an enclosed combustion chamber, an opening formed along one end wall of each of said heat exchanger units near the bottom of said combustion chamber for receiving a burner assembly, a smoke outlet opening in said one end wall at the top of said combustion chamber, a plate assembly for attachment to said heat exchanger units whereby said heat exchanger units are disposed side-by-side with respect to each other, said plate assembly including spaced apart openings formed therein and corresponding to the respective openings in said heat exchanger units, flange means on one of said heat exchanger units and said plate assembly extending into the openings of the other of said heat exchanger units and said plate assembly and being deformed outwardly of said openings into engagement with said heat exchanger units to form joints between said plate assembly and said heat exchanger units at said openings and for supporting said heat exchanger units with respect to said plate assembly, and a support member for securing said heat exchanger units interconnected at respective predetermined points on said perimeter flanges of each of said heat exchanger units, said support member comprising an angle section having spaced apart slots formed therein, a gusset portion of said support member adjacent each of said slots being formed to permit insertion of said perimeter flange into said slot and said gusset portion being deformable in a direction to forcibly engage and lock said perimeter flange in engagement with said support member.

13. A furnace heat exchanger assembly:
opposed clam shell sections joined together to form an enclosure defining a combustion chamber;
a substantially continuous rim formed by the walls of said opposed sections about an opening in said combustion chamber, said rim including a walled offset in at least a portion thereof inclined radially relative to the axis of said opening; and
a plate member having a seamless flange defining an opening generally matched for superposed positioned setting with the opening of said combustion chamber, said flange being secured to said rim in an expanded metal wrapping engagement along common surfaces including at least the surface of said rim offset facing inward of said combustion chamber.

14. A furnace heat exchanger in accordance with claim 13 in which said rim offset is inclined radially inward and said plate member flange extends inward of said combustion chamber for effecting engagement with the inward facing surface of said rim offset.

15. A furnace heat exchanger in accordance with claim 13 in which said plate member flange terminates closely adjacent the innermost edge defining said rim offset.

* * * * *